(No Model.)
A. N. BELL.
DOMESTIC GARBAGE BURNER.
No. 264,920. Patented Sept. 26, 1882.
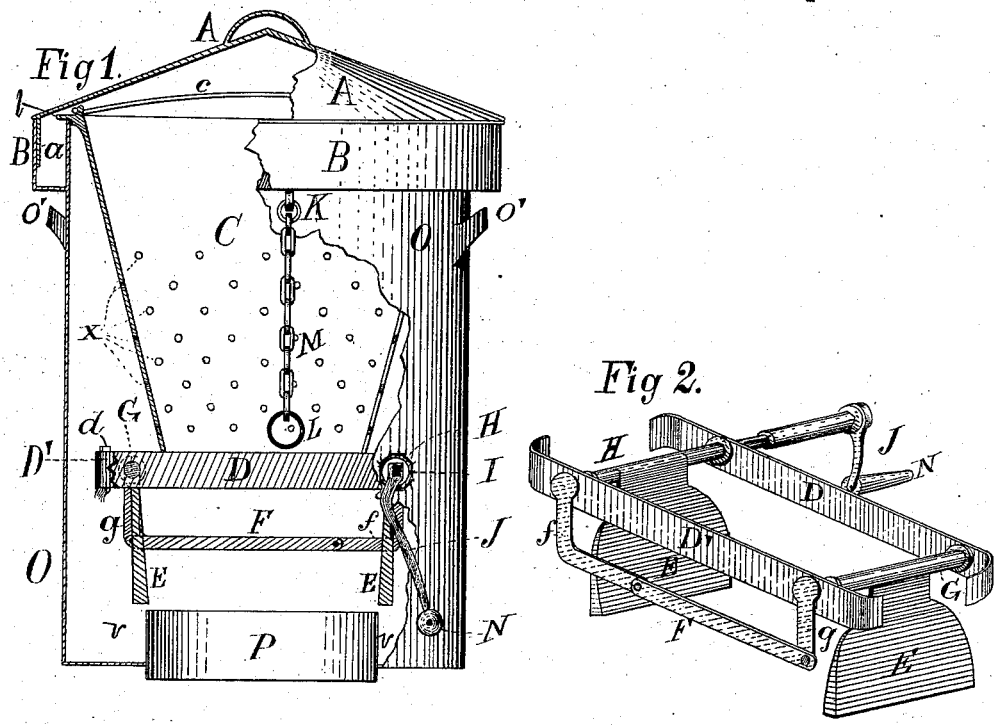
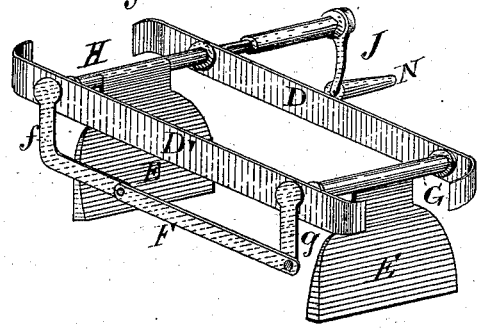
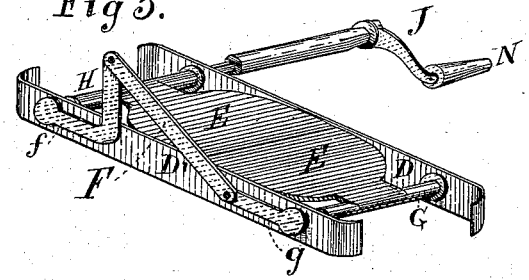
Witnesses:
Andrew G. Myers.
F. Pennoy Er.
Inventor:
Agrippa Nelson Bell

UNITED STATES PATENT OFFICE.

AGRIPPA N. BELL, OF GARDEN CITY, NEW YORK.

DOMESTIC GARBAGE-BURNER.

SPECIFICATION forming part of Letters Patent No. 264,920, dated September 26, 1882.

Application filed February 12, 1881. (No model.)

*To all whom it may concern:*

Be it known that I, AGRIPPA NELSON BELL, of Garden City, Queens county, and State of New York, have invented a certain new and useful Improvement in Domestic Garbage-Burners, of which the following is a specification.

My invention relates to a device for burning the garbage which collects about a kitchen, whether liquid or solid in form, in a way which prevents odor and does not clog or dampen the fire over which it is burned.

The invention will be understood as set forth in the following description and claims.

The accompanying drawings form a part of this specification, and illustrate what I consider the best means of carrying the invention into practice.

Figure 1 is an elevation of the device, a part being in section. Fig. 2 is a perspective view of the dumping device with the wings tripped. Fig. 3 is a similar view with the wings up. Fig. 4 is a piece of the exterior vessel, showing a hook on which certain parts rest.

Similar letters of reference indicate like parts in all the figures.

A is the lid, formed with the lip $a$ extending downward near the edge into the condenser-trap B, which is formed around the top of the kettle O. The kettle O is provided with handles O' on the opposite sides of outside, and on the inside, a considerable way down, it has the hooks $d$, four in number, to support the dumping-frame. In the bottom the kettle is provided with the ring P, extending both inside and out, forming on the inside the catch-basin $v$, into which the water falls and is evaporated. Exterior to the bottom it forms a means for setting into the stove-hole. The heat and flames from the stove beneath enter freely the opening formed by the band.

A pail, C, rests upon the rim of the kettle O and extends down into the kettle. It is conical in form and punctured, as shown at $x$, and provided with the bail $c$, by which it is lifted in or out. It is open at bottom and top, but has a movable bottom furnished by the smaller end resting over the dumping-plates E E, which swing in the frame D D'. The sides D D' of the frame have curved ends, which rest in the hooks $d$ on the inner side of the kettle. The rods G H form their connection. To these the wings E E are rigidly fastened. The rod H extends out through the side of the kettle through the stuffing-box I, and is provided with the crank J and handle N. At the opposite ends the rods outside of the part D' are fitted with the crank-levers F, $f$, and $g$, having a joint between each part. By turning these, as shown in Fig. 2, the wings E are tripped and the contents of the pail C are dumped; but by turning them as shown in Fig. 3 the wings E form a bottom for the pail C and retain the contents.

The garbage to be burned is placed in the pail C; the wings E being closed, the coarser, solid parts are retained in the pail; while the liquid escapes through the punctures $x$ into the catch-basin $v$, where they are evaporated by heat from below. A ready access of heat is insured through the opening formed by the ring P. The heat acts upon the base of the pail and along its sides, a liberal space being had by reason of the tapering form of the pail, and the contents of the pail are deprived of all their moisture and may be dumped into the fire through the trap E, or be taken out and used for kindling material. The water which has fallen into the basin $v$ will be readily evaporated. A secure position of the pail is insured by the ledge $l$, which rests upon the top of the pail. Any steam generated in the device arises against the top lid, A, and is condensed and runs down into the pan B.

The dumping-bottom is retained in position, when raised, by slipping the ring L over the handle N. The ring is supported from the margin of the pan B by means of the hook K and chain M, which is of just sufficient length to bring the link to the right height.

What I claim is—

1. In a garbage-burner, the combination, with the kettle O, having an aperture in the base for the admission of the flame and heat, of the straining-pail C and dumping-bottom, substantially as set forth.

2. The combination of the kettle O, cover A, base-aperture, and inserted ring P, extending both inside and outside of the bottom, forming a stove-ring on the outside and partitioning off the liquid-chamber $v$ on the inside, with the perforated conical pail C and removable or dumping bottom, substantially as set forth.

3. The kettle O, provided with the chamber $v$ and drip-chamber B, in combination with the cover A, having the lip $a$ inserted in the drip-chamber B, and with the strainer C, provided with a dumping-bottom, substantially as set forth.

4. In a garbage-burner of the kind described, the combination, with the kettle O, having suitable supporting means for the dumping-frame, and with the strainer C, of the dumping-frame D D', dumping-wings E E, shafts H G, and connecting-levers F $f$ $g$, as set forth.

5. The kettle O, provided with the ring P, in combination with the pail C and dumping-bottom, as set forth.

6. The garbage-burner described, consisting of the kettle O, provided with pan B and ring P, in combination with pail C $x$ and dumping-bottom E D D' F $f$ $g$ G H, as set forth.

AGRIPPA NELSON BELL.

Witnesses:
ANDREW G. MYERS,
F. PENNOYER.